(12) United States Patent
Mohr

(10) Patent No.: US 7,331,427 B2
(45) Date of Patent: Feb. 19, 2008

(54) DISC BRAKE

(75) Inventor: Kurt Mohr, Halsenbach-Ehr (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/779,293

(22) Filed: Feb. 13, 2004

(65) Prior Publication Data

US 2004/0159512 A1   Aug. 19, 2004

Related U.S. Application Data

(63) Continuation of application No. PCT/EP02/08843, filed on Aug. 7, 2002.

(30) Foreign Application Priority Data

Aug. 16, 2001   (DE) ................ 101 40 021

(51) Int. Cl.
*F16D 66/00* (2006.01)
*B60T 8/00* (2006.01)

(52) U.S. Cl. ................ 188/1.11 E; 303/112

(58) Field of Classification Search .......... 188/1.11 R, 188/1.11 E, 71.1, 73.41–73.45, 181 T; 303/112 X, 303/71.1, 73.41–73.45, 181 T, 112
See application file for complete search history.

(56) References Cited

U.S. PATENT DOCUMENTS 3,689,121 A   9/1972   Kawabe et al.
4,615,419 A   10/1986   Gaiser
4,679,668 A   7/1987   Washizu et al.
4,716,994 A   1/1988   Iwamoto
5,279,394 A   1/1994   Wollenweber et al.
6,059,379 A   5/2000   Deml et al.

FOREIGN PATENT DOCUMENTS

| DE | 90 10 026 | 12/1991 |
|---|---|---|
| DE | 43 24 620 | 1/1995 |
| DE | 196 39 686 | 4/1998 |
| EP | 523338 A2 * | 1/1993 |
| JP | 61 275 049 | 12/1986 |
| JP | 10 016 761 | 1/1998 |

* cited by examiner

Primary Examiner—Xuan Lan Nguyen
(74) Attorney, Agent, or Firm—MacMillan, Sobanski & Todd, LLC

(57) ABSTRACT

A disc brake (10) is described, comprising a brake disc (12) and two brake shoes (20), which are pressable against both sides of the brake disc (12) and which in relation to a peripheral force (C') generated upon application of the brake shoes (20) against the brake disc (12) are supported against a vehicle-fixed carrier (14). The disc brake (10) moreover comprises at least one device (34) for measuring and/or converting the peripheral force (C'), which device is disposed in a force transmission chain between the brake shoe (20) and the carrier (14). A force transmission member in the form of e.g. a swivel element (30) is disposed between the brake shoe (20) and the device (34) for measuring and/or converting the peripheral force (C') and is movable under guidance parallel to the brake disc (12).

15 Claims, 4 Drawing Sheets

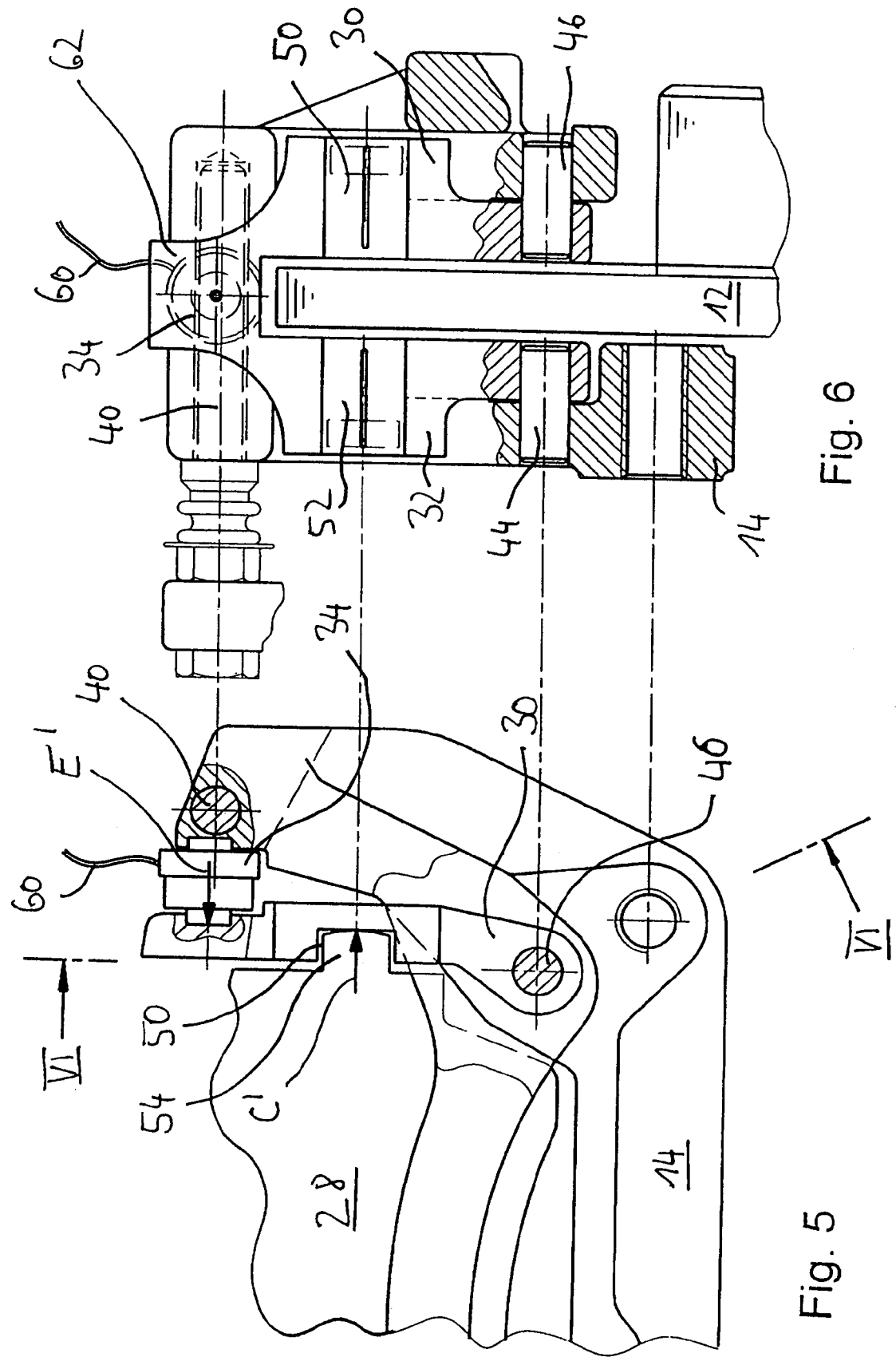

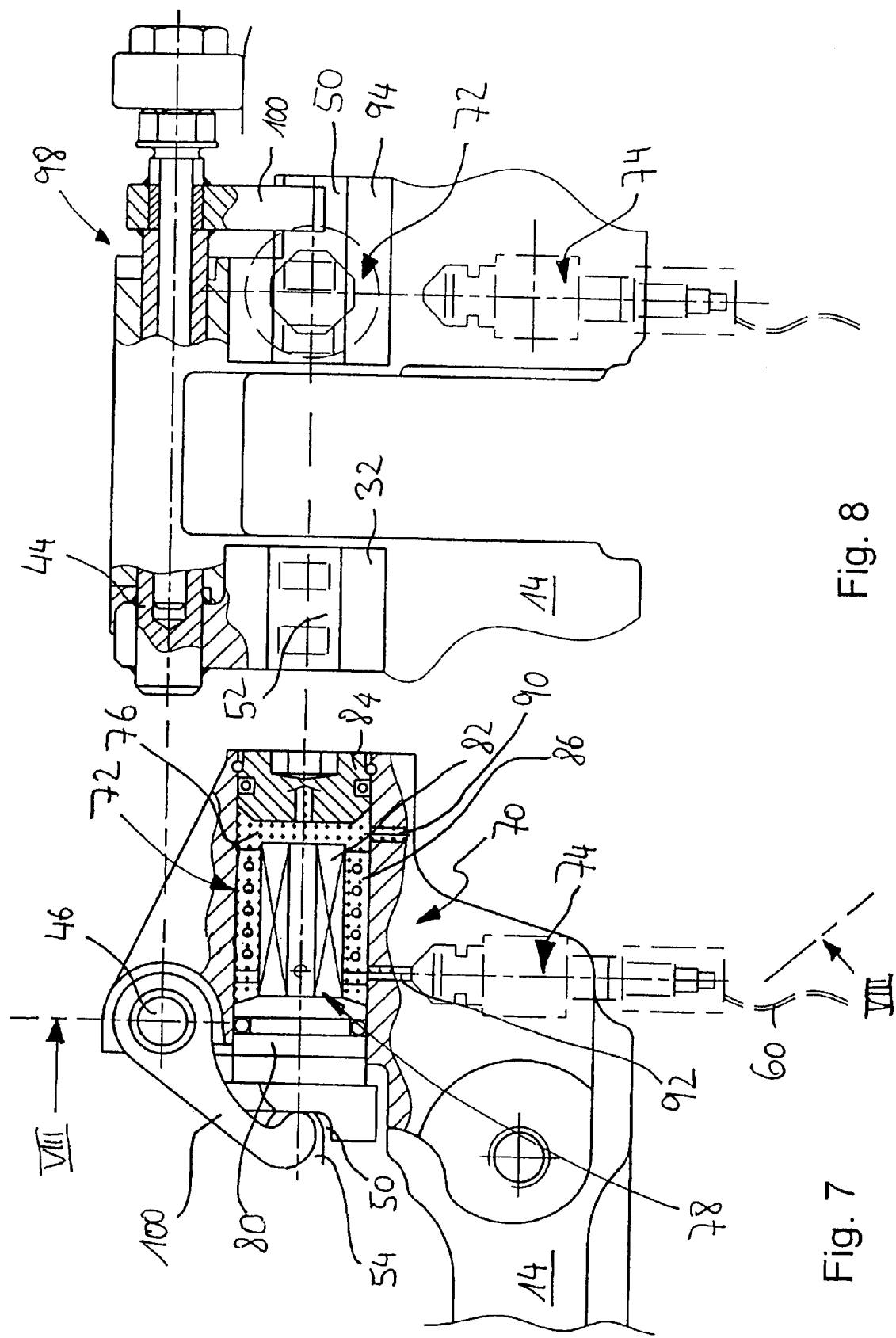

DISC BRAKE

CROSS REFERENCE TO RELATED APPLICATIONS

This application is a continuation of International Application No. PCT/EP02/08843 filed Aug. 7, 2002, the disclosures of which are incorporated herein by reference, and which claimed priority to German Patent Application No. 101 40 021.7 filed Aug. 16, 2001, the disclosures of which are incorporated herein by reference.

BACKGROUND OF THE INVENTION

The invention relates to a disc brake comprising a brake disc and two brake shoes, which are pressable against both sides of the brake disc and in relation to a peripheral force generated upon application of the brake shoes against the brake disc are supported against a vehicle-fixed carrier, and comprising at least one device for measuring and/or converting the peripheral force, which device is disposed in a force transmission chain between at least one of the brake shoes and the carrier.

Modern brake systems, for control and feedback control purposes, require an exact measurement of the forces occurring during a braking operation. Usually, these forces are subdivided into transverse forces (also known as normal forces or clamping forces) and peripheral forces (also known as frictional forces). The component of force introduced by a brake shoe into the brake disc at right angles to the plane of the brake disc is described as a transverse force. By peripheral force, on the other hand, is meant the component of force, which on account of the brake friction between a friction lining of the brake shoe and the brake disc acts in peripheral direction of the brake disc upon the brake shoe. By multiplying the peripheral force by the distance of the application point of the peripheral force from the axis of rotation of the wheels, the braking torque may be determined.

Many applications require an exact knowledge of the actual magnitude of the braking torque and hence also an exact knowledge of the peripheral force. For example, the braking torque may be used to form a precise closed-loop control circuit for electrohydraulic and electromotive brake systems.

In the case of the disc brake known from DE-GM 90 10 026, and corresponding U.S. Pat. No. 5,279,394, both of which are incorporated by reference herein, measurement of the peripheral force is effected by means of a force sensor, which is disposed on or in a guide pin. This guide pin is firmly connected to the initially mentioned, vehicle-fixed carrier and engages into a slide groove. The slide groove is formed on a structural part connected rigidly to one of the brake shoes and is displaceable in relation to the guide pin.

A further disc brake, which for measuring the peripheral force comprises a force sensor disposed in a force transmission chain between at least one of the brake shoes and a vehicle-fixed carrier, is known from DE 196 39 686, and corresponding U.S. Pat. No. 6,059,379, both of which are incorporated by reference herein. The force sensor is disposed on a fastening screw, by means of which a caliper of the disc brake is connected to the vehicle-fixed carrier.

It has been found that measurement of the peripheral force in the disc brakes known from prior art is prone to error because of various influences. These errors make it difficult to achieve precise control or feedback control of brake systems.

The underlying object of the invention is to indicate a disc brake, which allows a more exact determination of the peripheral forces that occur during a braking operation.

SUMMARY OF THE INVENTION

In a disc brake of the initially described type this object is achieved according to the invention in that between at least one of the brake shoes and the device for measuring and/or converting the peripheral force at least one force transmission member is disposed, which is movable under guidance parallel to the brake disc.

Such an arrangement of the force transmission member guarantees that a transverse force introduced by a brake shoe into the force transmission member acts, not upon the device for measuring and/or converting the peripheral force, but upon a guide provided for the force transmission member. The device for measuring and/or converting the peripheral force is consequently acted upon exclusively by the peripheral force and is able to measure and/or convert the peripheral force precisely. The transverse force, on the other hand, is "filtered out" by means of the force transmission member and does not influence the measurement and/or conversion of the peripheral force.

As already explained, the transverse force introduced by a brake shoe into the force transmission member is advantageously taken up by a guide provided for the force transmission member. The guide may take the form of a groove, rail, bearing for a bolt coupled to the force transmission member etc. In an advantageous manner, the guide of the force transmission member is coupled rigidly to the vehicle-fixed carrier. The effect achieved thereby is that the transverse force introduced into the guide may be taken up by the carrier.

The force transmission member may be guided parallel to the brake disc along different paths. It is, for example, conceivable for the force transmission member to be guided in a translatory manner, e.g. along a straight line, or rotary manner, e.g. along a circular path. Rotary guidance of the force transmission member is preferred. In said case a possible option is, for example, to design the force transmission member as a swivel element in the manner of a rocker. The swivel element preferably has a swivelling axis parallel to an axis of rotation of the brake disc and may be coupled to the carrier. If, on the other hand, the force transmission member is to be guided in a translatory manner, it may be provided e.g. in the form of a sliding element.

A force transmission member movable under guidance parallel to the brake disc may be disposed at a single side or at opposite sides of the brake disc. In the latter case, a total of two force transmission members are provided, wherein each force transmission member interacts with one brake shoe.

When two force transmission members are provided, a separate device for measuring and/or converting the peripheral force may be provided for each force transmission member. In said manner, the peripheral force may be separately measured and/or converted for the, in relation to the brake disc, vehicle-inner brake shoe and for the vehicle-outer brake shoe.

Two force transmission members disposed at opposite sides of the brake disc may be coupled to one another. This coupling is preferably designed in such a way that the forces, which are introduced in each case by the vehicle-inner and vehicle-outer brake shoe into the force transmission members, are combined, i.e. added together. In said case, it is sufficient to provide for the coupled force transmission members a common device for measuring and/or converting the peripheral force.

The coupling of the force transmission members disposed at opposite sides of the brake disc is preferably of a rigid design, e.g. in the manner of a bridge. Such a rigid coupling has the advantage that the brake shoes are stabilized relative to one another and markedly reduces the oblique wear of the friction linings.

The device for measuring and/or converting the peripheral force may be disposed in any desired manner, provided it is guaranteed that the device is disposed downstream of the force transmission member in the force transmission chain of the peripheral force from at least one of the brake shoes to the vehicle-fixed carrier. A possible option is to integrate the device into the force transmission member. This is effected e.g. in such a way that the force force transmission member acted upon by the peripheral force may be supported by means of the device against the vehicle-fixed carrier. On the vehicle-fixed carrier there may be formed, for said purpose, a stop for the force force transmission member equipped with the device for measuring and/or converting the peripheral force.

The device for measuring and/or converting the peripheral force may comprise a force sensor. The force sensor is designed e.g. as a piezoelectric element. Such a piezoelectric element may also be actively controlled in order, in the manner of an actuator, to generate a positive feedback so that guidance noises occurring during a braking operation are compensated. According to an alternative development, the device for measuring and/or converting the peripheral force comprises a force transducer and a sensor for detecting the converted force. The force transducer may be e.g. a force/pressure transducer, downstream of which a pressure sensor is functionally connected. A downstream pressure sensor may by virtue of a hydraulic connection be disposed remote from the brake, e.g. on the steering knuckle or shock-absorbing strut, so that it is not subject to the thermal load at the brake.

So that the forces occurring during a braking operation may be reliably introduced by the brake shoe into the force transmission member, a keyed connection may be established at least during a braking operation between the brake disc and the force transmission member. For this purpose, the force transmission member may be profiled at a region interacting with the at least one brake shoe, and the at least one brake shoe may have a complementary profiling. In an advantageous manner, the profiling of the brake shoe or the profiling of the force transmission member is designed in the manner of a groove, which extends parallel to the axis of rotation of the brake disc and into which a complementary profiling of the respective other element engages in a movable manner.

The disc brake according to the invention is suitable for use in a wide variety of brake systems. A use of the disc brake in electrohydraulic or electromotive vehicle brake systems is preferred. In such vehicle brake systems, the measured peripheral force is advantageously used for feedback control purposes.

Other advantages of this invention will become apparent to those skilled in the art from the following detailed description of the preferred embodiments, when read in light of the accompanying drawings.

BRIEF DESCRIPTION OF THE DRAWINGS

FIG. 5 a detail view according to FIG. 3 of a second embodiment of a disc brake according to the invention;

FIG. 6 a region section along the line VI-VI of FIG. 5;

FIG. 7 a detail view according to FIG. 3 of a third embodiment of a disc brake according to the invention; and FIG. 8 a region section along the line VIII-VIII of FIG. 7.

DETAILED DESCRIPTION OF THE INVENTION

Figure 2:
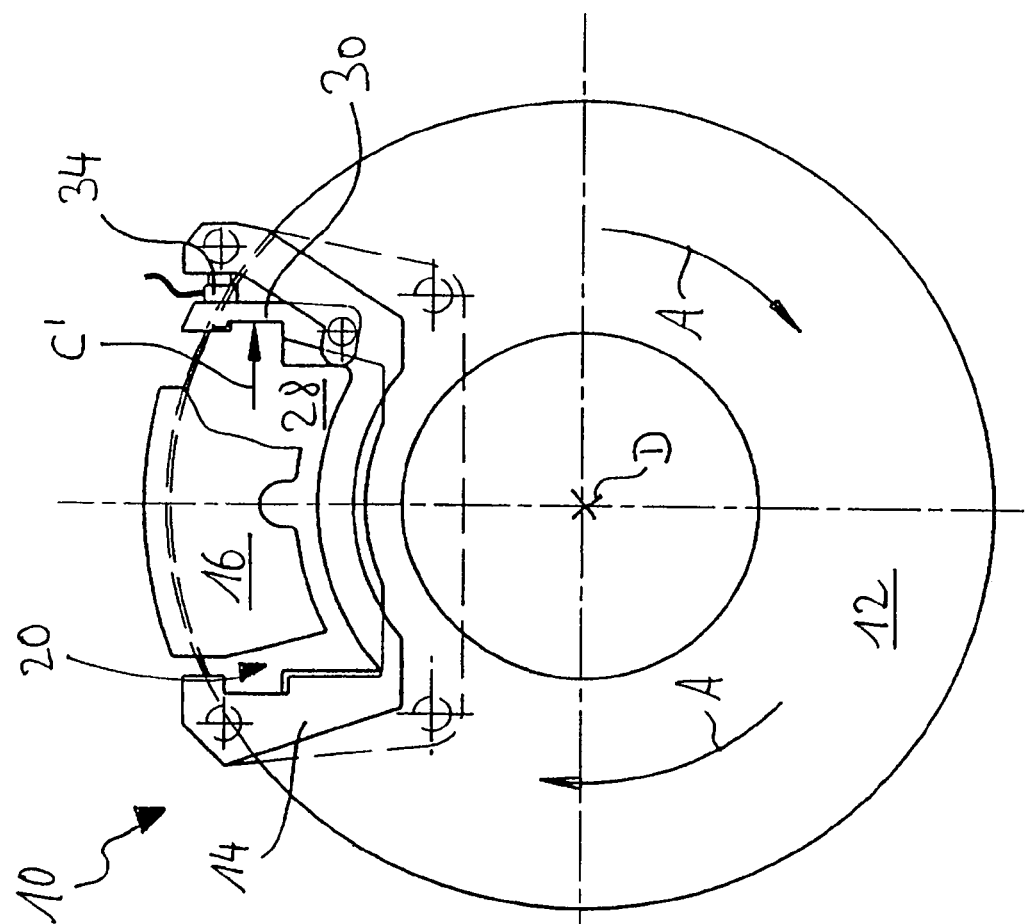
FIG. 2 a further side view of the disc brake according to FIG. 1 (viewed in the direction of the axis of rotation of the brake disc)
Figure 1:
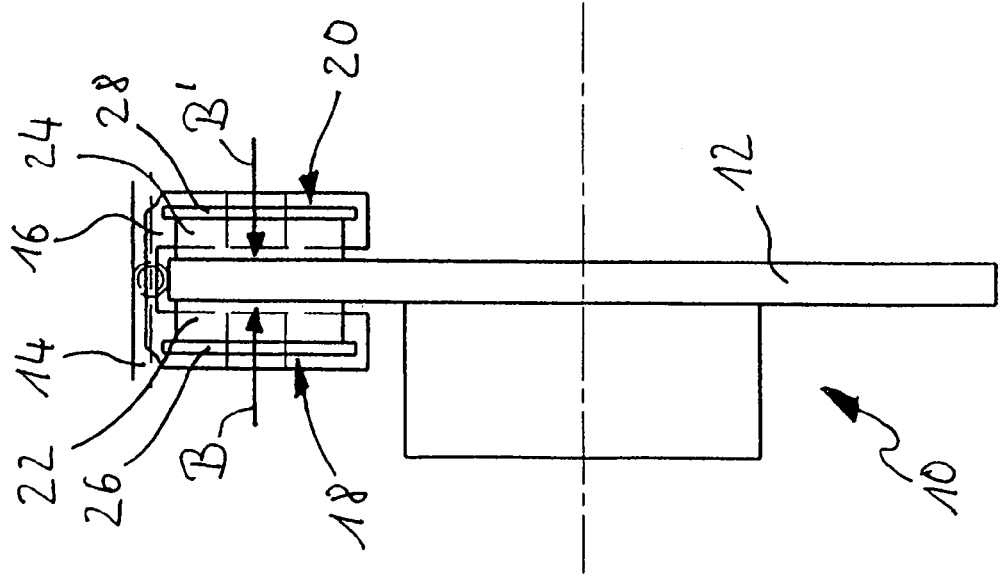
FIG. 1 a side view of a first embodiment of a disc brake according to the invention (viewed in a direction at right angles to the axis of rotation of the brake disc)

FIGS. 1 to 4 show a first embodiment of a disc brake 10 according to the invention of a vehicle brake system. The disc brake 10 has a brake disc 12, which during forward travel of the vehicle moves in the direction of the arrows A in the side view according to FIG. 2. The disc brake 10 is supported in a conventional manner on a brake carrier 14, which is mounted in a vehicle-fixed manner, i.e. does not move in relation to the vehicle. A caliper 16 overlaps the brake disc 12.

Two brake shoes 18, 20 are disposed on both sides of the brake disc 12 and each have a friction lining 22, 24, which for braking purposes is pressable against the brake disc 12. In the customary manner the friction linings 22, 24 are fastened in each case on carrier plates 26, 28.

An actuation of the disc brake 10 results in the friction linings 22, 24 being pressed in the direction of the arrows B, B' against the brake disc 12. The arrows B, B' therefore symbolize the clamping or transverse force. The clamping force is generated in a manner known from prior art by means of an actuating mechanism, which is not illustrated in the drawings. The clamping action between the friction linings 22, 24 of the clamping jaws 18, 20 and the brake disc 12 generates a frictional force (peripheral force), which is denoted by the arrow C' in FIG. 2 for the brake shoe 20. The brake shoe 18, which is not shown in FIG. 2, is also acted upon by a corresponding peripheral force.

As is evident from FIGS. 1 to 4, the forces generated during a braking operation are introduced in the direction of the arrow C' and, in part, also in the direction of the arrows B, B' into force transmission members 30, 32, which are supported against the vehicle-fixed carrier 14 in each case by means of a device 34, 36 for measuring and/or converting the peripheral force. The vehicle-fixed carrier 14 is in turn rigidly connected to the vehicle by means of suitable fastening bolts 40.

Each of the two force transmission members is designed as a swivel element 30, 32 in the manner of a rocker. The swivel elements 30, 32 are coupled in each case by means of a fastening bolt 44, 46 pivotally to the carrier 14. The swivelling axes of the swivel elements 30, 32 defined by the bolts 44, 46 extend parallel to the axis of rotation D (FIG. 2) of the brake disc 12. The bolts 44, 46 therefore allow a guided rotational movement of the swivel elements 30, 32 parallel to the brake disc 12, i.e. parallel to a plane containing the brake disc 12.

As a result of the previously described mounting of the swivel elements 30, 32, the component of transverse force loading the swivel elements 30, 32 in the direction of the arrows B, B' (FIG. 1) is introduced by the swivel elements 30, 32 via the bolts 44, 46 into the carrier 14. In contrast thereto, the component of peripheral force introduced in the direction of the arrow C' (FIG. 2) into the swivel elements 30, 32 is transmitted directly into the devices 34, 36 for measuring and/or converting the peripheral force, which are supported against the carrier 14. In other words, the fact that the swivel elements 30, 32 are mounted in a manner that takes up transverse force guarantees that the forces introduced into the swivel elements 30, 32 are cleared of transverse force when they act upon the devices 34, 36 for measuring the peripheral force.

Figures 3, 4:
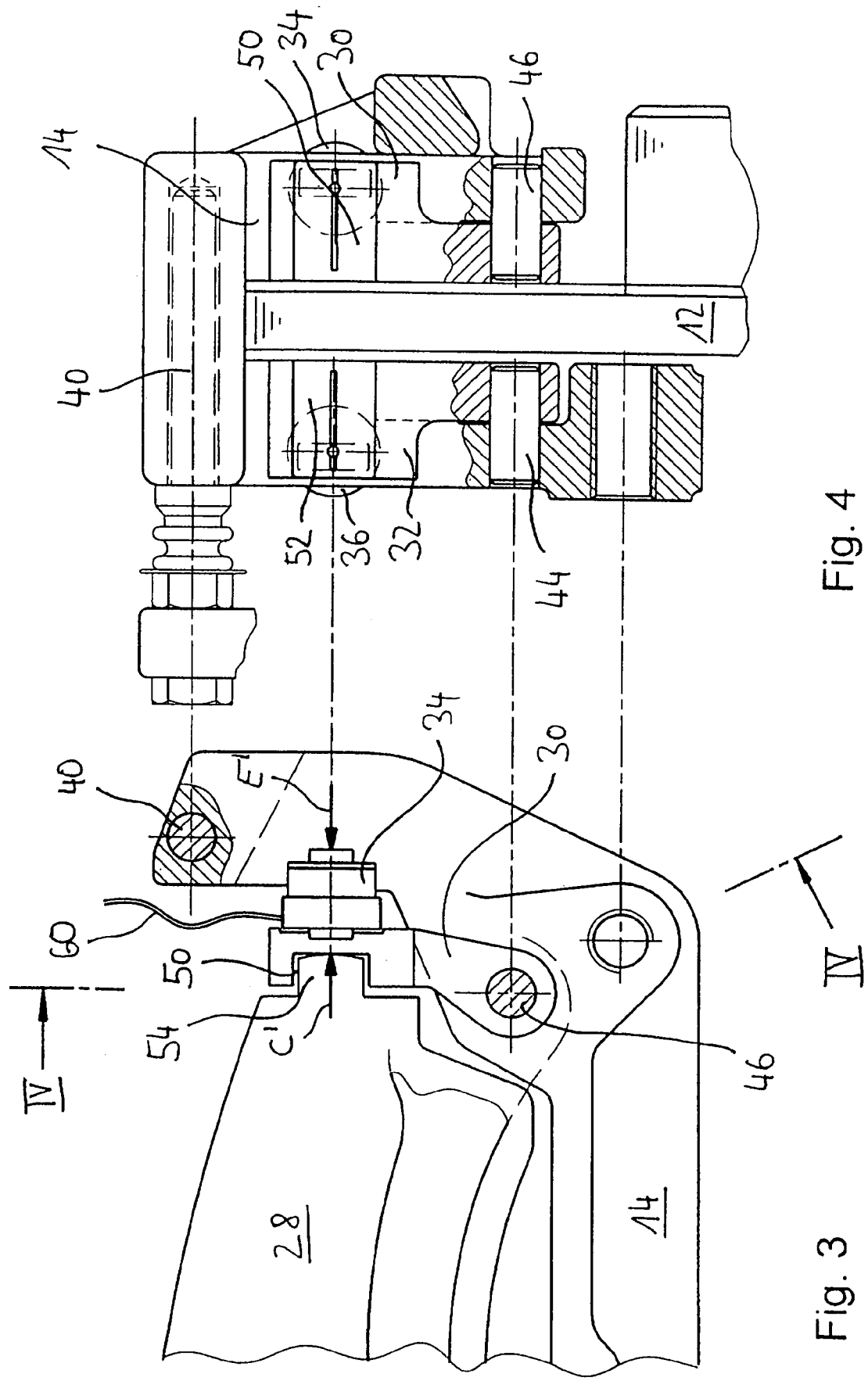
FIG. 3 a detail view of the disc brake according to FIG. 2.
FIG. 4 a region section along the line IV-IV of FIG. 3.

The carrier plates 26, 28 interact in a positive manner with the swivel elements 30, 32. To said end, there is formed in each swivel element 30, 32 a groove-shaped indentation 50, 52, which extends parallel to the axis of rotation D of the brake disc 12 and in which in each case a journal-like projection of the carrier plates 26, 28 engages. In FIG. 3 this is illustrated by the example of engagement of the journal-like projection 54 of the carrier plate 28 into the groove 50 of the swivel arm 30.

The devices for measuring and/or converting the peripheral force, which are illustrated in FIGS. 2 to 4, are piezoceramic force sensors 30, 32, into which the peripheral force is introduced by means of the swivel elements 30, 32 and which convert this peripheral force into an electric signal.

The electric signal produced by the force sensors 34, 36 may be supplied by means of electric lines to an electronic control or feedback control system, which is not illustrated in the drawings. FIG. 3 shows by way of example the electric line 60 of the force sensor 34. The force sensors 34, 36 in the present embodiment are integrated into the carrier 14. It might however also conceivable to integrate the force sensors 34, 36 into the swivel element 30, 32. It would also in principle be conceivable to dispose additional elements workingly between the force transmission members in the form of the swivel elements 30, 32 and the devices for measuring and/or converting the peripheral force in the form of the force sensors 34, 36 or between these devices and the carrier 14.

In the first embodiment of a disc brake according to the invention described with reference to FIGS. 1 to 4, the force transmission members and the devices for measuring and/or converting the peripheral force are disposed in such a way that the forces arising during braking of a forward motion of the vehicle may be measured. It is however also possible, in addition to or instead of the forces arising during braking of a forward motion, to measure and/or convert the forces arising during braking of a reverse motion. Thus, in addition to the device for measuring and/or converting the peripheral force disposed at the right side of the carrier plate 28 in FIG. 2 and to the force transmission member, such components might also be provided at the opposite side of the carrier plate 28.

In the disc brake 10 according to the first embodiment, which is illustrated in FIGS. 1 to 4, the two swivel elements 30, 32 are not coupled to one another. For this reason, the two force sensors 34, 36 measure the peripheral force for the vehicle-inner brake shoe 18 and the vehicle-outer brake shoe 20 (FIG. 1) separately. According to the second embodiment of a disc brake according to the invention, which is illustrated in FIGS. 5 and 6, the peripheral force for the two brake shoes 18 and 20 is measured by means of only a single force sensor 34.

The disc brake according to the second embodiment, details of which are illustrated in FIGS. 5 and 6, corresponds substantially to the disc brake of the first embodiment. In a departure from the first embodiment, however, in the disc brake according to the second embodiment the swivel elements 30, 32 disposed at opposite sides of the brake disc 12 are bridged by means of a central portion 62 and therefore rigidly coupled to one another (FIG. 6). The single force sensor 34 is disposed in the region of this central portion 62 bridging the two swivel elements 30, 32.

In FIGS. 5 and 6 the force sensor 34 has been offset relative to its position in the first embodiment (see FIGS. 3 and 4) upwards in the direction of the bridging portion 62. As a result, the point of application of the force denoted by the arrow C' on the swivel arm 30 no longer lies on one and the same horizontal straight line as the point of application of the counterforce symbolized by the arrow E (cf. FIG. 3).

The effect of the bridging 62 of the two swivel elements 30, 32, which is illustrated in FIGS. 5 and 6, is a summing of the peripheral forces acting upon the two brake shoes 18, 20. A further effect of the bridging 62 of the two swivel elements 30, 32 is a stabilizing of the brake shoes 18, 20 relative to one another and hence a reduction of the oblique wear of the friction linings 22, 24.

FIGS. 7 and 8 show details of a third embodiment of a disc brake according to the invention. The disc brake according to the third embodiment is similar to the disc brake of the second embodiment. Once again, a common device 70 for measuring and/or converting the peripheral force is provided, so that this device 70 determines the sum of the peripheral force caused by the vehicle-inner and the vehicle-outer brake shoe.

The device 70 for measuring and/or converting the peripheral force comprises two subassemblies, namely a force/pressure transducer 72, on the one hand, and a pressure sensor 74, on the other hand. The force/pressure transducer 72 comprises a cylindrical bore 76, which is formed in the carrier 14 and in which a piston 78 comprising a piston head 80 and a piston rod 82 is displaceably guided. The cylindrical bore 76 is closed at the rear, i.e. at its end remote from the piston head 80, by an insert 84. Inside the cylindrical bore 76 a hollow-cylindrical guide 86 permeable to a liquid medium is formed for the piston rod 82 and a liquid medium, e.g. oil, is disposed. The cylindrical bore 76 is connected to two liquid lines 90, 92, which penetrate the carrier 14. The cylindrical bore 76 is connected by the first liquid line 90 to a supply system for the liquid and by the second liquid line 92 to the pressure sensor 74. The function of the device 70 for measuring and/or converting the peripheral force is described in greater detail further below.

The disc brake according to the third embodiment comprises two force transmission members movable under guidance parallel to the brake disc, namely, on the one hand, a swivel element 32 coupled to the carrier 14 and, on the other hand, a plate-shaped force transmission member 94, which is coupled to the piston head 80. This coupling of the plate-shaped force transmission member 94 to the piston 78 guarantees a guided movement of the plate-shaped force transmission member 94 parallel to the brake disc because of the interaction of the piston rod 82 with the guide 86 provided for the piston rod 82 and the interaction of the piston head 80 with the inner wall of the cylindrical bore 76. Because of this translatory guidance of the plate-shaped force transmission member 94, a transverse force introduced into the force transmission member 94 is transmitted by means of the piston 78 to the vehicle-fixed carrier 14. The peripheral force introduced into the plate-shaped force transmission member 94, on the other hand, effects a displacement of the piston 78 to the right in FIG. 7. Because of this displacement of the piston 78 the liquid medium disposed in the region of the cylindrical bore 76 is compressed, and the pressure inside the cylindrical bore 76 rises. This pressure rise proportional to the peripheral force is detected by the pressure sensor 74 and supplied by means of electric lines 60 as an electric signal to an electronic control or feedback control system, which is not illustrated in the drawings.

Forces are introduced into the plate-shaped force transmission member 94 not only by the brake shoe associated with this force transmission member 94 but also by a second brake shoe lying, in relation to the brake disc, opposite this first brake shoe, and are introduced namely by means of a transmission arrangement 98. The transmission arrangement 98 comprises a transmission element in the form of a swivel element 32, which is associated with the second brake shoe, a bearing bolt 44 penetrating the carrier 14 parallel to the axis of rotation of the brake disc, and an arm 100 interacting with the plate-shaped force transmission member 94. Both the swivel element 32 and the arm 100 are connected by means of laser welding to the bolt 44 and disposed at right angles thereto.

A transverse force acting upon the swivel element 32 is introduced via the bolt 44, which is rigidly coupled to the swivel element 32, into the carrier 14. A peripheral force introduced into the swivel element 32, on the other hand, is transmitted by means of the bolt 44 to the arm 100 and from the latter to the plate-shaped force transmission member 94. The transmission arrangement 98 therefore allows a coupling of swivel element 32 and plate-shaped force transmission member 94.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A disc brake comprising:
   a caliper;
   two brake shoes, which are pressable against both sides of a brake disc and which in relation to a peripheral force generated upon application of the brake shoes against the brake disc are supported against a vehicle-fixed carrier, wherein the peripheral force in dependence upon a direction of rotation of the brake disc acts in one of two opposite peripheral force directions;
   at least one device for at least one of measuring and converting the peripheral force, the device being disposed in a force transmission chain between at least one of the brake shoes and the carrier; and
   at least one force transmission member, which is disposed between at least one of the brake shoes and the device for at least one of measuring and converting the peripheral force; and
   a guide for guiding movement of the at least one force transmission member, the guide being rigidly attached to the carrier at a run-out side of the disc brake;
   wherein the at least one force transmission member is movable relative to the carrier under guidance in a plane parallel to the brake disc such that a transverse force introduced into the force transmission member by the brake shoe is substantially not transmitted to the device for at least one of measuring and converting the peripheral force, and wherein the at least one force transmission member is disposed at one side relative to the caliper in order to take up and transmit the generated peripheral force in only one of the two peripheral force directions.

2. The disc brake according to claim 1, wherein the force transmission member is guided in a translatory manner.

3. The disc brake according to claim 1, wherein the force transmission member is guided in a rotary manner.

4. The disc brake according to claim 3, wherein the force transmission member is a swivel element, which has a swivelling axis parallel to an axis of rotation of the brake disc.

5. The disc brake according to claim 4, wherein the swivel element is coupled to the carrier.

6. The disc brake according to claim 1, wherein one force transmission member is disposed at each opposite side of the brake disc.

7. The disc brake according to claim 6, wherein for each force transmission member a separate device for at least one of measuring and converting the peripheral force is provided.

8. The disc brake according to claim 6, wherein the force transmission members disposed at opposite sides of the brake disc are coupled to one another.

9. The disc brake according to claim 8, wherein for the coupled force transmission members a common device for at least one of measuring and converting the peripheral force is provided.

10. The disc brake according to claim 1, wherein the device for at least one of measuring and converting the peripheral force is integrated into the force transmission member.

11. The disc brake according to claim 1, wherein the device for at least one of measuring and converting the peripheral force comprises a force sensor.

12. The disc brake according to claim 1, wherein the device for at least one of measuring and converting the peripheral force comprises a force/pressure transducer and a pressure sensor.

13. The disc brake according to claim 1, wherein the force transmission member is profiled at a region interacting with the at least one brake shoe and wherein the at least one brake shoe has a complementary profiling.

14. A vehicle brake system having a disc brake, the disc brake comprising:
   a caliper;
   two brake shoes, which are pressable against both sides of a brake disc and which in relation to a peripheral force generated upon application of the brake shoes against the brake disc are supported against a vehicle-fixed carrier, wherein the peripheral force in dependence upon a direction of rotation of the brake disc acts in one of two opposite peripheral force directions;
   at least one device for at least one of measuring and converting the peripheral force, the device being disposed in a force transmission chain between at least one of the brake shoes and the carrier; and
   at least one force transmission member, which is disposed between at least one of the brake shoes and the device for at least one of measuring and converting the peripheral force; and
   a guide for guiding movement of the at least one force transmission member, the guide being rigidly attached to the carrier at a run-out side or a run-in side of the disc brake;
   wherein the at least one force transmission member is mounted on the guide at one side relative to the caliper and is movable relative to the carrier under guidance in a plane parallel to the brake disc such that a transverse force introduced into the force transmission member by the brake shoe is substantially not transmitted to the device for at least one of measuring and converting the peripheral force, and wherein the at least one force transmission member takes up and transmits the generated peripheral force in only one of the two peripheral force directions.

15. A disc brake comprising:

a brake carrier adapted to be rigidly fixed to a vehicle;

a caliper which is carried by the brake carrier and overlaps a brake disc for introducing a braking force into the brake disc;

two brake shoes, which are pressable via the caliper against both sides of the brake disc and which in relation to a peripheral force generated upon application of the brake shoes against the brake disc are supported against upstanding parts of the brake carrier adjacent the brake shoes, wherein the peripheral force in dependence upon a direction of rotation of the brake disc acts in one of two opposite peripheral force directions;

at least one device for at least one of measuring and converting the peripheral force, the device being disposed in a force transmission chain between at least one of the brake shoes and the brake carrier; and at least one force transmission member, which is disposed between at least one of the brake shoes and the device for at least one of measuring and converting the peripheral force; and a guide for guiding movement of the at least one force transmission member, the guide being rigidly attached to the carrier at a run-out side of the disc brake;

wherein the at least one force transmission member is movable relative to the brake carrier under guidance in a plane parallel to the brake disc such that a transverse force introduced into the force transmission member by the brake shoe is substantially not transmitted to the device for at least one of measuring and converting the peripheral force, and wherein the at least one force transmission member is disposed at one side relative to the caliper in order to take up and transmit the generated peripheral force in only one of the two peripheral force directions.

* * * * *